(12) United States Patent
Jagadish et al.

(10) Patent No.: US 9,514,217 B2
(45) Date of Patent: Dec. 6, 2016

(54) MESSAGE INDEX SUBDIVIDED BASED ON TIME INTERVALS

(71) Applicant: LinkedIn Corporation, Mountain View, CA (US)

(72) Inventors: Swaroop Jagadish, Mountain View, CA (US); Abraham Sebastian, Santa Clara, CA (US); Yun Sun, Sunnyvale, CA (US); Shirshanka Das, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 55 days.

(21) Appl. No.: 13/935,088

(22) Filed: Jul. 3, 2013

(65) Prior Publication Data
US 2014/0359029 A1    Dec. 4, 2014

Related U.S. Application Data
(60) Provisional application No. 61/829,751, filed on May 31, 2013.

(51) Int. Cl.
*G06F 15/16*    (2006.01)
*G06F 17/30*    (2006.01)
*H04L 12/58*    (2006.01)

(52) U.S. Cl.
CPC ... *G06F 17/30619* (2013.01); *G06F 17/30631* (2013.01); *H04L 51/046* (2013.01); *H04L 51/22* (2013.01); *G06F 17/30864* (2013.01)

(58) Field of Classification Search
CPC ................... G06F 17/30864; G06F 17/30631
USPC ........................................................ 709/206
See application file for complete search history.

(56) References Cited

U.S. PATENT DOCUMENTS

| | | | | |
|---|---|---|---|---|
| 6,167,402 A | * | 12/2000 | Yeager | |
| 2005/0004989 A1 | * | 1/2005 | Satterfield et al. | 709/206 |
| 2011/0196855 A1 | * | 8/2011 | Wable et al. | 707/711 |
| 2011/0258630 A1 | * | 10/2011 | Fee et al. | 718/101 |
| 2013/0218896 A1 | * | 8/2013 | Palay | 707/741 |
| 2014/0108587 A1 | * | 4/2014 | Goldberg et al. | 709/215 |
| 2014/0244618 A1 | * | 8/2014 | Lynch et al. | 707/722 |

* cited by examiner

*Primary Examiner* — Wing F Chan
*Assistant Examiner* — Joseph Maniwang
(74) *Attorney, Agent, or Firm* — Park, Vaughan, Fleming & Dowler LLP (57) ABSTRACT

During a storage technique, multiple messages (such as emails) associated with a user of a communication application are received. Then, the multiple messages are stored in a message table associated with the user and the multiple messages are indexed in an index associated with the user. This index may be divided into multiple divisions if a total number of messages stored in the message table exceeds a threshold value, where each division corresponds to messages received during a different time interval.

20 Claims, 6 Drawing Sheets

MESSAGE INDEX SUBDIVIDED BASED ON TIME INTERVALS

CROSS REFERENCE TO RELATED APPLICATION

This application claims priority under 35 U.S.C. §119(e) to U.S. Provisional Application Ser. No. 61/829,751, entitled "Message Index Subdivided Based on Time Intervals," by Swaroop Jagadish, Abraham Sebastian, Yun Sun and Shirshanka Das, filed on May 31, 2013, the contents of which are herein incorporated by reference.

This application is related to U.S. Non-Provisional Application Ser. No. TBA, entitled "Transactional Key-Value Database with Searchable Indexes," by Abraham Sebastian, Swaroop Jagadish, Yun Sun, Bob Schulman and Shirshanka Das, filed on Jul. 3, 2013, the contents of which are herein incorporated by reference.

BACKGROUND

Field

The described embodiments relate to techniques for storing information associated with a communication application. More specifically, the described embodiments relate to techniques for indexing multiple messages associated with a user in an index that is divided into multiple divisions for messages in different time intervals if the total number of messages exceeds a threshold value.

Related Art

Incoming and outgoing messages associated with a communication application (such as emails associated with an email application) are often stored in data structures for subsequent use. For example, the messages may be stored in a message table and, to facilitate fast access to particular types of messages (such as unread or read messages), the messages are often indexed.

However, some users of a communication application may have very large numbers of messages, such as 10,000 messages or more. When there are this many messages, it can be time-consuming and difficult to open the index. It can also be difficult to perform subsequent operations on the index, such as searches for particular types of messages or for content (e.g., keywords) in the messages. These delays are frustrating to users and can degrade the user experience when using the communication application.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for storing information associated with a communication application, and a computer-program product (e.g., software) for use with the computer system are described. During this storage technique, multiple messages (such as emails) associated with a user of the communication application are received. Then, the multiple messages are stored in a message table associated with the user and the multiple messages are indexed in an index associated with the user. This index may be divided into multiple divisions if a total number of messages stored in the message table exceeds a threshold value, where each division corresponds to messages received during a different time interval.

In this way, the storage technique may ensure that the index can be opened and subsequent operations (such as searches) can be performed on the index quickly, even when the user has a large number of messages stored in the message table. Furthermore, by dividing the index according to messages received during different time intervals, the divisions can be accessed in an efficient manner (such as sequentially) to access information about the messages (such as information related to a query). Thus, the storage technique may reduce or eliminate delays associated with the index, and may improve the user experience when using the communication application. This may increase customer loyalty, as well as revenue, of the communication application.

In the discussion that follows, an individual, a user or a recipient of the content may include a person (for example, an existing customer, a new customer, a student, an employer, a supplier, a service provider, a vendor, a contractor, etc.). More generally, the storage technique may be used by an organization, a business and/or a government agency. Furthermore, a 'business' should be understood to include: for-profit corporations, non-profit corporations, groups (or cohorts) of individuals, sole proprietorships, government agencies, partnerships, etc.

Figure 1:
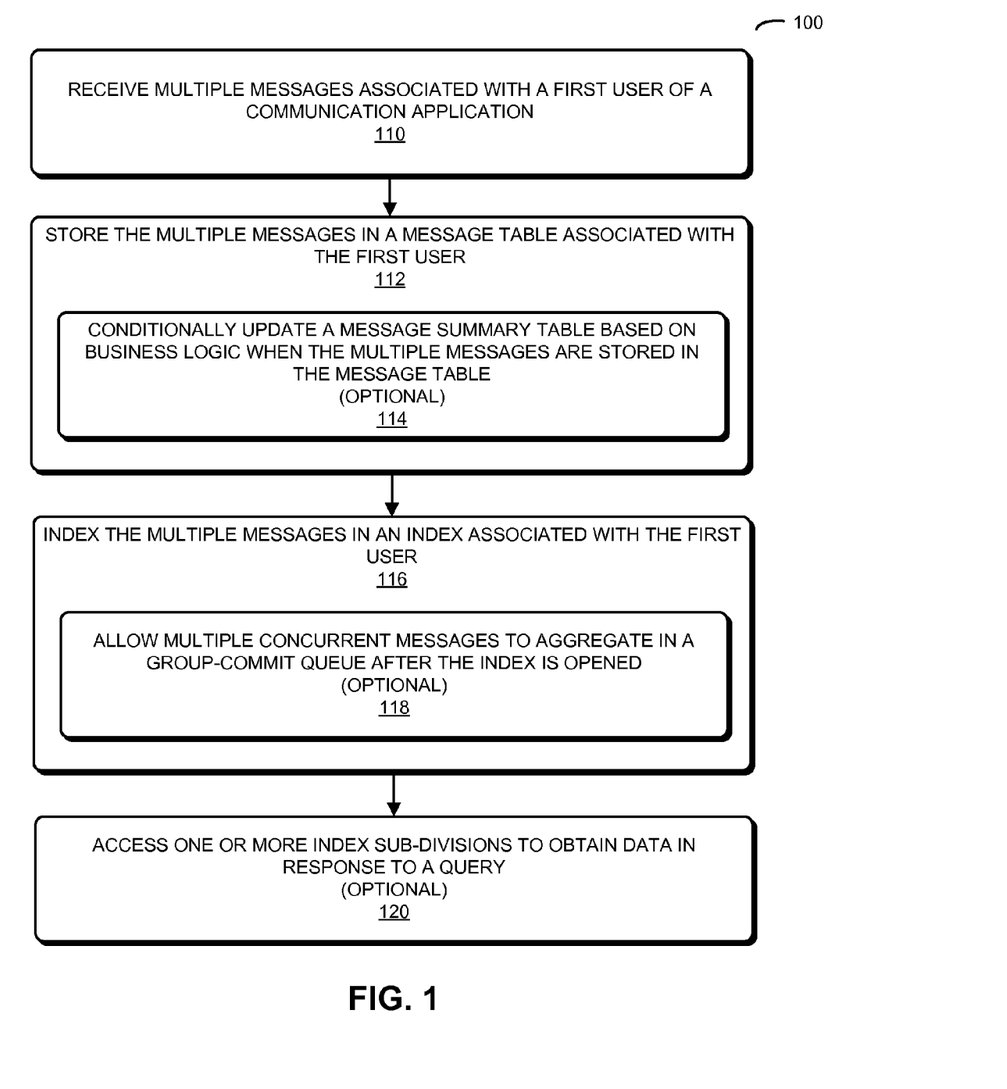
FIG. 1 is a flow chart illustrating a method for storing information associated with a communication application in accordance with an embodiment of the present disclosure.

We now describe embodiments of the method. FIG. 1 presents a flow chart illustrating a method 100 for storing information associated with a communication application, which may be performed by a computer system (such as computer system 500 in FIG. 5). During operation, the computer system receives multiple messages associated with a first user of the communication application (operation 110). For example, the messages may be emails, and the communication application may be an email application. As another example, the messages may be instant messages and the communication application may be an instant-messaging application. Moreover, as described further below with reference to FIG. 4, this first user may have professional interconnections with other users of the communication application as specified by a social graph.

Then, the computer system stores the multiple messages in a message table associated with the first user (operation 112). The computer system may optionally conditionally update a message summary table based on business logic (such as predicates) when the multiple messages are stored in the message table (operation 114). This may be useful for certain types of operations (which are sometimes referred to as 'declarative aggregates') that are very time-consuming to perform (such as determining an aggregate value, e.g., determining a total number of messages in the message table). In principle, each update to the message summary table can involve accessing both the message table and the message summary table. Because this is time-consuming, it may be preferable to avoid repeating the types of operations to reduce the time needed to determine an aggregate value. Instead, by using the business logic, the message summary table may be conditionally updated (automatically) when transactions occur, such as when new messages are stored in the message table, and the business logic is achieved (i.e., the rules are triggered). Note that the business logic may include language to express predicates based on a schema for the message table.

Furthermore, the computer system indexes the multiple messages in an index associated with the first user (operation 116), where the index is divided into multiple divisions if a total number of messages stored in the message table exceeds a threshold value, and where each division corresponds to messages received during a different time interval. This index is also uniquely associated with the corresponding message table.

Storing the information in the index may involve opening the index. As described further below with reference to FIG. 3, note that the multiple messages may include concurrent messages (such as emails to a group of recipients) that are aggregated in a group-commit queue at least while the index is being opened, and the storing of the multiple messages in the message table and the indexing of the multiple messages may occur as a batch operation. For example, the first user may have written a bunch of messages while offline and these messages are sent concurrently once the first user is online. Alternative, the first user may have sent an instance of a message to myriad addressees (although, in this case only one copy of the message may be stored in the first user's 'sent' box).

The aggregation may reduce the number of times the message table and the index are opened and, thus, may reduce the time needed to store the messages and the information. In some embodiments, the computer system optionally delays the storing of the multiple messages in the message table and the indexing of the multiple messages for a time interval (such as tens of milliseconds) to allow the multiple concurrent messages to aggregate in the group-commit queue after the index is opened (operation 118).

In some embodiments, the computer system optionally accesses one or more of the index sub-divisions to obtain data in response to a query (operation 120), where the one or more of the index sub-divisions are accessed sequentially starting with a temporal sub-division associated with a most-recent time interval until a number-of-messages limit associated with the query is achieved. Note that the number-of-messages limit may be specified by the communication application. For example, the number-of-messages limit may specify a number of query results presented in a document by the communication application, such as a pagination limit of 15 messages per page.

Figure 2:
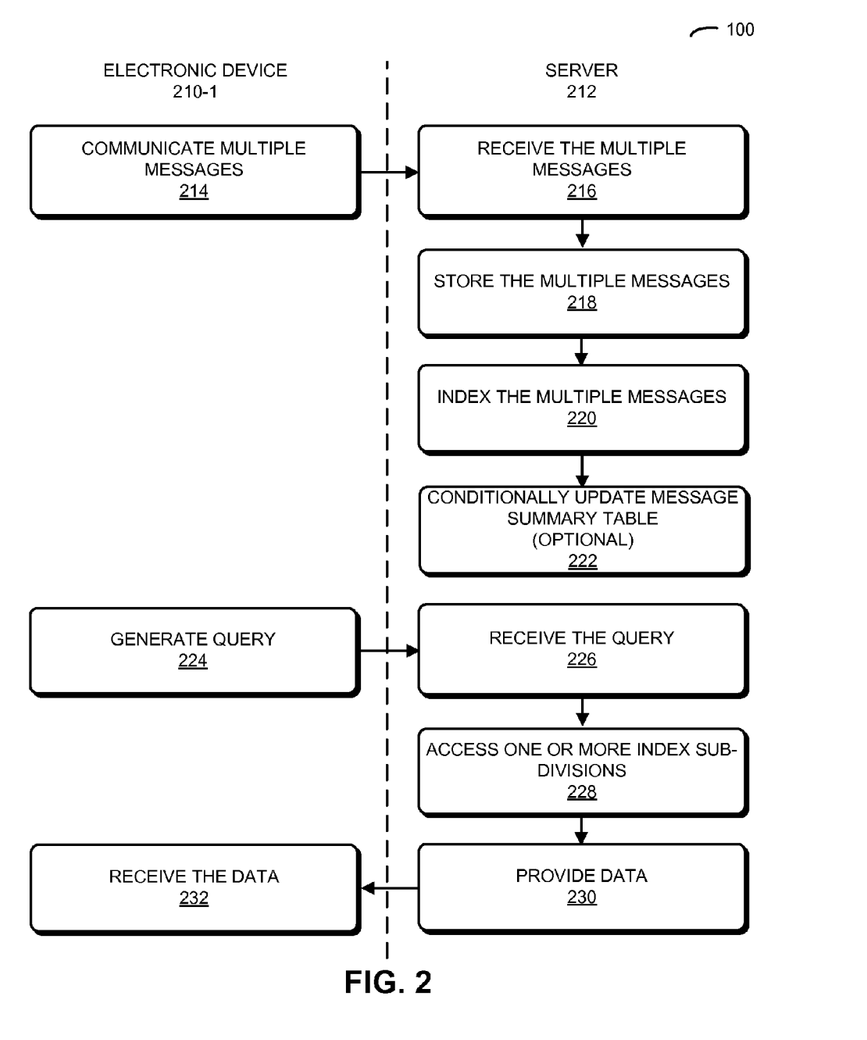
FIG. 2 is a flow chart further illustrating the method of FIG. 1 in accordance with an embodiment of the present disclosure.

In an exemplary embodiment, the storage technique is implemented using an electronic device (such as a computer, a cellular telephone and/or a portable electronic device) and at least one server, which communicate through a network, such as a cellular-telephone network and/or the Internet (e.g., using a client-server architecture). This is illustrated in FIG. 2, which presents a flow chart illustrating method 100 (FIG. 1). During this method, the user of electronic device 210-1 may communicate the multiple messages (operation 214) using the communication application. When the multiple messages are received (operation 216) by server 212, server 212 may store the multiple messages (operation 218) in the message table and may index the multiple messages (operation 220) in the index.

Figure 3:
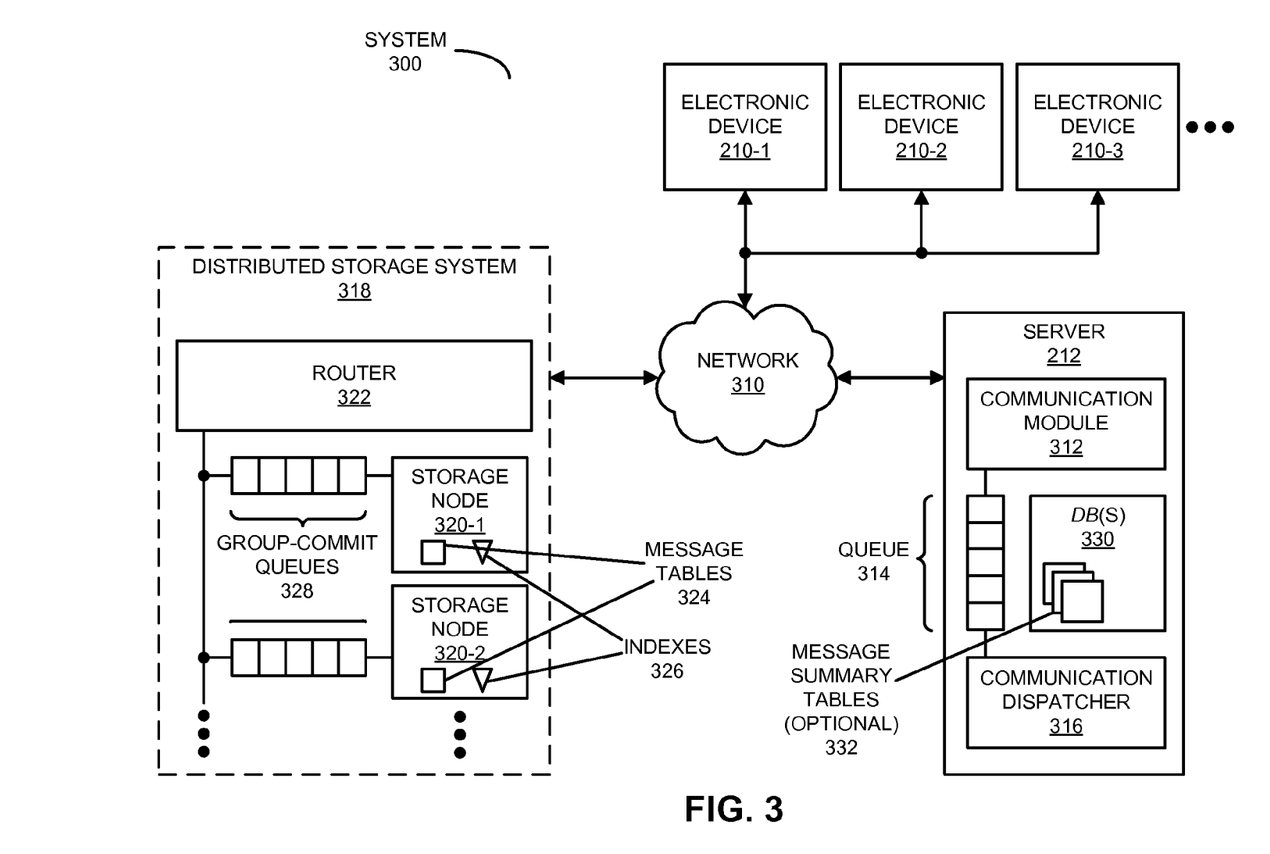
FIG. 3 is a block diagram illustrating a system that performs the method of FIGS. 1 and 2 in accordance with an embodiment of the present disclosure.

As noted previously, if the multiple messages are communicated concurrently, the messages in operation 218 and the information in operation 220 may be, respectively, stored and indexed as a group based on the messages aggregated in a group-commit queue (which is described further below with reference to FIG. 3). Moreover, server 212 may optionally conditionally update the message summary table (operation 222) based on the business logic when the multiple messages are stored in the message table in operation 218.

Then, electronic device 210-1 may generate the query (operation 224) using the communication application. For example, the communication application may request the 15 most-recent unread emails. In response to receiving the query (operation 226), server 212 may optionally access the one or more of the index sub-divisions (operation 228) to obtain data in response to the query. Next, server 212 may provide (operation 230) and electronic device 210-1 may receive (operation 232) the data.

In some embodiments of method 100 (FIGS. 1 and 2), there may be additional or fewer operations. For example, while not shown in FIG. 2, in some embodiments multiple users may send messages to the user of electronic device 210-1. In this case, operations 214 and 224 would not both be performed by electronic device 210-1. Moreover, the order of the operations may be changed, and/or two or more operations may be combined into a single operation.

We now describe embodiments of the system and the computer system, and their use. FIG. 3 presents a block diagram illustrating a system 300 that performs method 100 (FIGS. 1 and 2). In this system, a user of electronic device 210-1 may use a software product, such as a software application that is resident on and that executes on electronic device 210-1.

Alternatively, the user may interact with a web page that is provided by server 212 via network 310, and which is rendered by a web browser on electronic device 210-1. For example, at least a portion of the software application may be an application tool that is embedded in the web page, and which executes in a virtual environment of the web browser. Thus, the application tool may be provided to the user via a client-server architecture.

The software application operated by the user may be a standalone application or a portion of another application that is resident on and which executes on electronic device 210-1 (such as a software application that is provided by server 212 or that is installed and which executes on electronic device 210-1).

As discussed previously, the user may use the software application (which may include the communication application) to communicate messages with other users of the software application on other electronic devices 210. For example, the user and the other users may be members of a social network (which, as described below with reference to FIG. 4, can be represented by a social graph), and the software application may allow the users to interact with each other within the social network. Furthermore, the user and the other users may each have mailboxes that include their messages (such as member-to-member messages with the social network, invitations for users to connect in the social graph, etc.), as well as the types of messages or the states of the messages (such as read, unread, etc.). Note that the communication application may support pagination. For example, the communication application may display a subset of the messages (such as 15/500 messages) per page.

When the user communicates the messages, the messages may be sent from electronic device 210-1 to server 212 via network 310. A communication module 312 (associated with the communication application) in a front-end of server 212 may output the messages to a queue 314 that feeds a communication dispatcher 316. Then, the messages may be communicated, via network 310, to the users of the other electronic devices 210.

Server 212 may also store the messages (and related attributes) in a distributed storage system 318. This distributed storage system may be a partitioned data storage system with multiple storage nodes 320 that each includes databases (such as a relational database, although other types of databases may be used) associated with the communication application. For example, mailboxes of the user and the other users may be partitioned across storage nodes 320. Thus, subsets of the mailboxes may be stored on particular storage nodes 320. This configuration may facilitate scaling of distributed storage system 318.

When storing the messages, a router 322 may convey the messages to the appropriate storage nodes 320 based on the users associated with the messages. Moreover, a given storage node (such as storage node 320-1) may store the messages in message tables 324 associated with the users (including the user and the other users), and may index information about these messages in corresponding indexes 326 associated with the users. For example, the messages for user B may be stored in user B's message table, and information about these messages may be indexed in the corresponding index. Note that the messages and the information may include attributes of the messages (such as read, unread, keywords). This may allow the messages to be retrieved in response to a query received from the instance of the software application on electronic device 210-1 based on the attributes (such as true/false searches or full-text searches).

For a small number of messages, all the user's messages can be indexed in a given partition or storage node in distributed storage system 318. Instead of indexing all of the messages in the mailboxes in a storage node in one index, separate indexes may be created for each mailbox. This allows the index to be opened at will when users are active. Typically, 1-2% of the users may be active at a given time, so the indexes for the entire dataset do not need to be opened concurrently.

However, some users may have very large mailboxes with 10,000 messages or more. The resulting indexes may be difficult to open in a relational database at the start of a user session. In addition, such large indexes can slow down other operations performed using the indexes. Therefore, the indexes for users with large mailboxes (such as those with more than 10,000 messages) may be time-partitioned or subdivided into buckets. For example, there may a bucket for messages having a timestamp between today and 5 days ago. This may facilitate the pagination supported by the software application. In particular, electronic device 210-1 may provide a request for the 15 most-recent messages for the user via network 310 (e.g., ?query: inBox=true AND count=15). In response, server 212 may access the index for the user in distributed storage system 318 starting with the bucket for messages having timestamps between today to 5 days ago (the current bucket), then the previous bucket (for messages having timestamps between 5 days ago and 10 days ago), etc., until the 15 most-recent messages are found. Then, server 212 may provide the 15 messages to electronic device 210-1 via network 310.

If a total hit count for a query is needed, all index buckets are opened and the query may be executed on each of the buckets, and the resulting counts may be combined to get the total hit count. The counts for older buckets may be cached so that not all index buckets need to be opened the next time a count is required for the same query. Moreover, the counts may be cached only for the most frequent queries. Typically, the cached counts for older buckets are rarely invalidated as users rarely update older messages. In this way, total hit counts for queries on a partitioned index may be efficiently computed without repeatedly opening all the index buckets. Caching counts in this way has very little overhead relative to the total amount of data in the message table or the index. This cache of counts may be maintained in volatile memory (such as DRAM) in which case the cache will be lost on process restarts. The cache can also be maintained in persistent storage, similar to the message table, in which case it is replicated and therefore highly available just like the message table. This approach may ensure that the cache survives process and machine restarts, and that a fully populated cache of counts is available in the event that a primary storage node fails and a standby storage node needs to take over.

In some embodiments, the buckets or sub-divisions of the indexes are further based on the number of messages. For example, a message count or the total amount of data may be used as a basis for a new index partition. In particular, if the message-count limit is 5,000 messages per bucket, the buckets or sub-divisions may still be time-based. However, if the number of messages in a given bucket exceeds 5,000 messages, a new bucket may be created for additional messages (beyond 5,000) within the same time interval.

When a message is communicated for one of the user and the other users (i.e., transmitted or received), server 212 may instruct distributed storage system 318 to update the message table and the associated index (and buckets) in one or more of storage nodes 320 in response to this transaction. One challenge associated with efficient storage of the messages and the information associated with the communication application occurs when there is a concurrent burst of messages for a given mailbox, such as when a user messages a group of the other users. In this case, communication dispatcher 316 may create message entries in a send folder that are aggregated in a group-commit queue in a given storage node (such as one of group-commit queues 328). For example, there may be 5000 messages in a group-commit queue because of a concurrent burst. If this number of messages exceeds the concurrent processing capability of storage node 320-1, the updates to the index may occur individually because the index cannot be updated while it is open. Consequently, the concurrency burst may result in a backlog that is processed serially.

To avoid this problem, the queued messages in the group-commit queue may be processed in batches when the index is opened for the first message in the group-commit queue, thereby significantly reducing the time needed to process the messages by reducing the number of times the index needs to be opened. In particular, while opening the index in response to the first message, storage node 320-1 may build or aggregate a batch of the additional messages that come into the group-commit queue, and then may process these messages as a batch. In some embodiments, the number of messages in a given batch may be increased by waiting for tens of milliseconds for more messages to arrive at the cost of increased latency.

Some queries or requests from the software application may be difficult and time-consuming to process in distributed storage system 318, such as counts, means and/or aggregates of all the messages in the message table and the index for a given user. Consequently, it may be desirable to avoid repeating such queries or requests. This may be implemented in distributed storage system 318 using declarative aggregates or business logic (such as predicates) in storage nodes 320 that maintain optional separate message summary tables 332 for each of the users' mailboxes in one or more databases (DBs) 330 in the front-end of server 212. Based on the business logic, a given message summary table for a given user may be conditionally updated when transactions occur.

For example, business logic may be used to define counters, such as application-specific logic that maintains an aggregate count of the number of unread messages. The business logic may be written in a language that expresses predicates based on schemas for tables in one or more of the databases in server 212 and distributed storage system 318 (e.g., msg read=false AND msg inbox=true). When a new message is received in a user's message table or a state of a message is changed (such as from unread to read) in the message table, the predicates may be evaluated. If these rules are triggered by the transaction, the message summary table for the user may be automatically updated. In this way, the message tables and the message summary tables for the user and the other users may be synchronized by performing transactions on the message tables.

Note that information in system 300 may be stored at one or more locations in system 300 (i.e., locally and/or remotely). Moreover, because this data may be sensitive in nature, it may be encrypted. For example, stored data and/or data communicated via network 310 may be encrypted.

Figure 4:
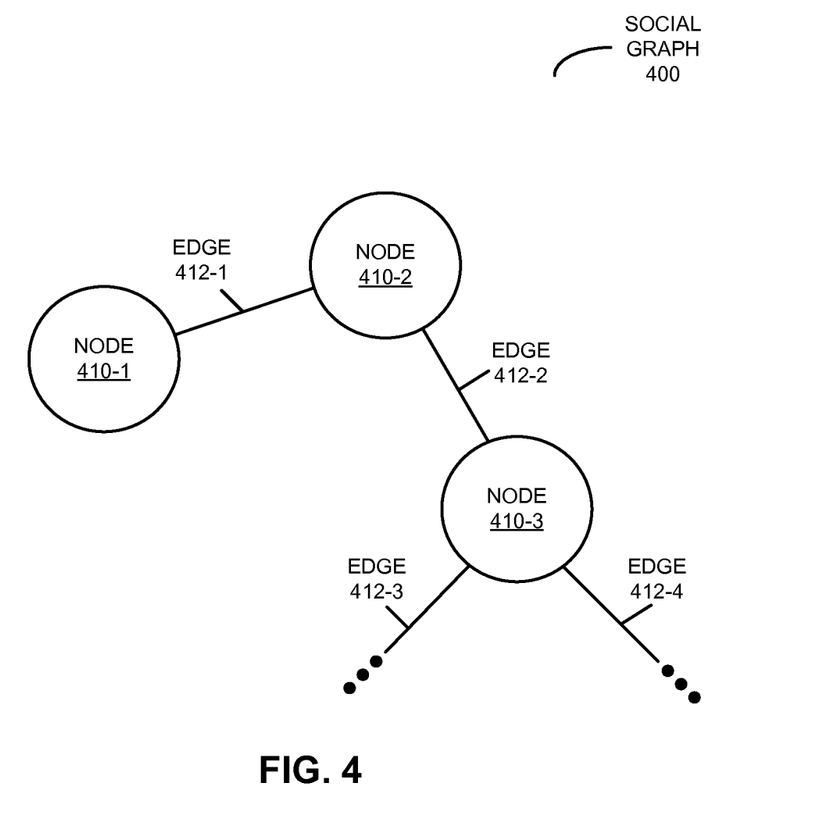
FIG. 4 is a drawing illustrating a social graph in accordance with an embodiment of the present disclosure.

We now further describe the social graph. As noted previously, the users, their attributes, associated organizations (or entities) and/or their interrelationships (or connections) may specify a social graph. FIG. 4 is a drawing illustrating a social graph 400. This social graph may represent the connections or interrelationships among nodes 410 (corresponding to users, attributes of the users, entities, etc.) using edges 412. In the context of the storage technique, social graph 400 may specify business information, and edges 412 may indicate interrelationships or connections between the users and organizations. However, in some embodiments, nodes 410 may be associated with attributes (such as skills) and business information (such as contact information) of the users and/or organizations.

In general, 'entity' should be understood to be a general term that encompasses: an individual, an attribute associated with one or more individuals (such as a type of skill), a company where the individual worked or an organization that includes (or included) the individual (e.g., a company, an educational institution, the government, the military), a school that the individual attended, a job title, etc. Collectively, the information in social graph 400 may specify profiles (such as business or personal profiles) of individuals.

Figure 5:
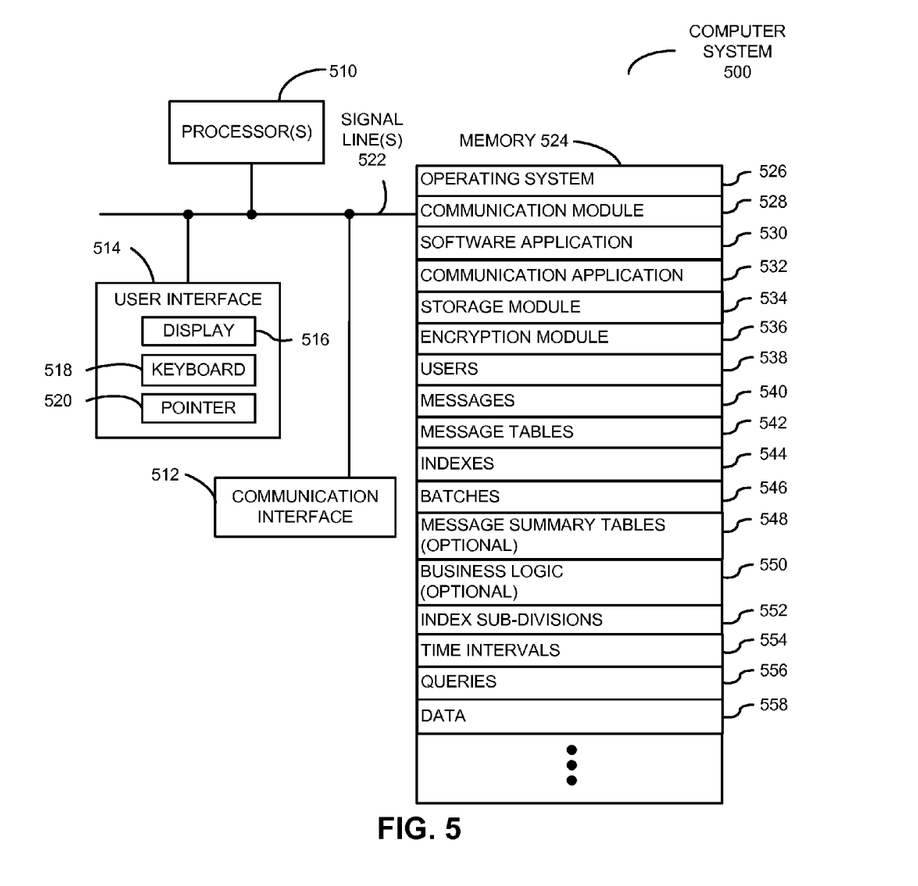
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516 (such as a touchscreen), a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: software application 530 (or a set of instructions), communication application 532 (or a set of instructions), storage module 534 (or a set of instructions), and/or encryption module 536 (or a set of instructions). Note that one or more of these program modules (or sets of instructions) may constitute a computer-program mechanism.

During operation of computer system 500, when using software application 530 (such as a software application that implements a social network), users 538 may communicate messages 540 associated with communication application 532 using communication module 528 and communication interface 512. Storage module 534 may store messages 540 in message tables 542 and may index information about messages 540 in indexes 544. If multiple messages in messages 540 are communicated concurrently, storage module 534 may, respectively, store and index these messages and the information as a group based on batches 546 (such as batches aggregated in group-commit queues 328 in FIG. 3). Alternatively or additionally, storage module 534 may conditionally update one or more optional message summary tables 548 based on optional business logic 550 when messages 540 are stored in one or more of messages tables 542.

Figure 6:
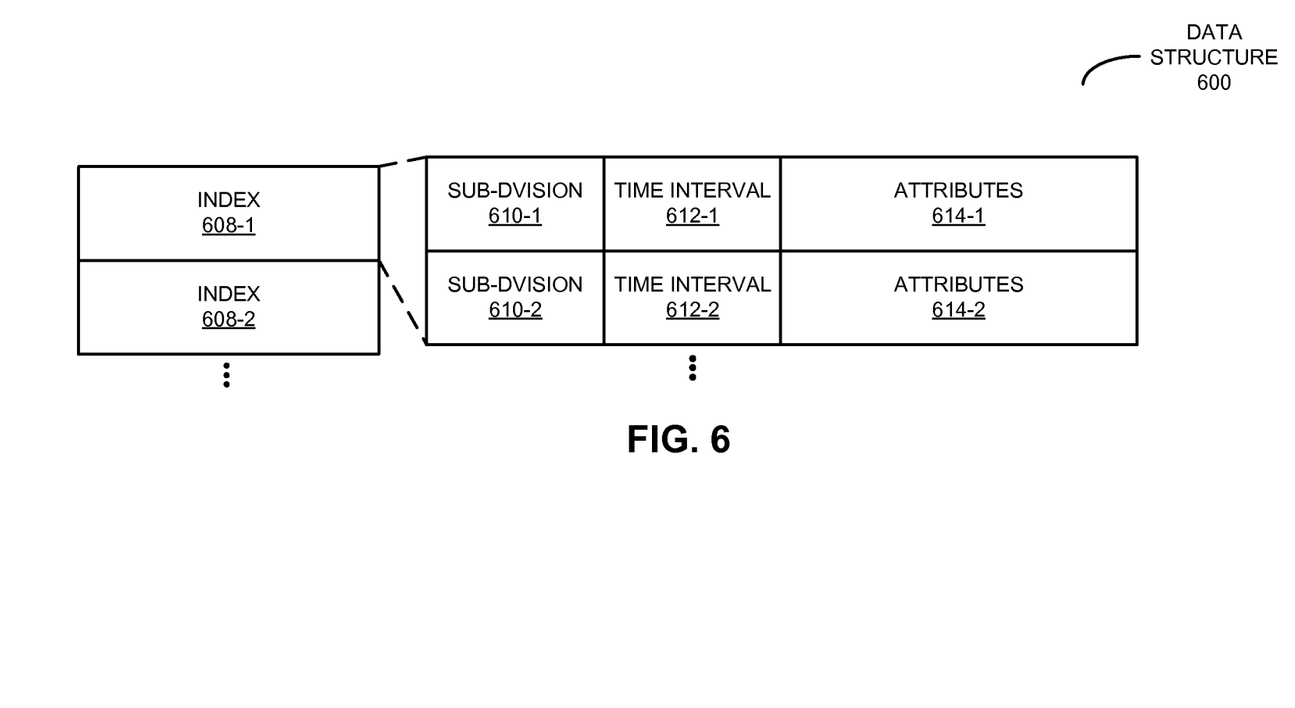
FIG. 6 is a block diagram illustrating a data structure for use in the computer system of FIG. 5 in accordance with an embodiment of the present disclosure.

Furthermore, if there are a large number of messages in a given message table, storage module 534 may subdivide the associated index into index buckets or index sub-divisions 552 that correspond to messages received during different time intervals 554. This is shown in FIG. 6, which presents a block diagram illustrating a data structure 600 with one or more indexes 608 for use in computer system 500 (FIG. 5). In particular, index 608-1 may include index sub-divisions 610 for time intervals 612, and an illustrative sub-division may include: index sub-division 610-1, time interval 612-1 of these messages, and attributes 614-1 associated with the messages (such as keywords and types or states of the messages).

Referring back to FIG. 5, when queries 556 associated with communication application 532 are received from users 538 via communication module 528 and communication interface 512, storage module 534 may access one or more of message tables 542 and indexes 544 to obtain data 558 in response to queries 556. Then, storage module 534 may provide data 558 to instances of software application 530 executing on electronic devices used by users 538 via communication module 528 and communication interface 512.

Because information in computer system 500 may be sensitive in nature, in some embodiments at least some of the data stored in memory 524 and/or at least some of the data communicated using communication module 528 is encrypted using encryption module 536.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over multiple servers or computers, with various groups of the servers or computers performing particular subsets of the functions. In some embodiments, some or all of the functionality of computer system 500 is implemented in one or more application-specific integrated circuits (ASICs) and/or one or more digital signal processors (DSPs).

Computer systems (such as computer system 500), as well as electronic devices, computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 310 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3), computer system 500 and/or data structure 600 (FIG. 6) may include fewer components or additional components. Moreover, two or more components may be combined into a single component, and/or a position of one or more components may be changed. In some embodiments, the functionality of system 300 (FIG. 3) and/or computer system 500 may be implemented more in hardware and less in software, or less in hardware and more in software, as is known in the art.

In the preceding discussion, separate indexes are maintained for each mailbox in the storage technique. Each of these indexes may be partitioned independently of the other indexes, and metadata may be maintained for each individual index to indicate how it is partitioned. For example, an index for the mailbox of a given user may be partitioned if there is a lot of activity for this mailbox. In this way, only larger indexes (such as those associated with mailboxes having more than 5,000 messages) may be partitioned. This storage technique is in contrast with the partitioning that is sometimes used in existing database management systems, in which indexes are sometimes time partitioned based on fixed time intervals, so that there is an index partition for the last month, a different index partition for the 6 months prior to that, and another index partition for everything before that. The challenge with this existing approach is that there may be a lot of activity in a given month and the associated index partition could be unusually large, which may result in a performance penalty. By partitioning based on usage or the update rate to the index, the described storage technique avoids this problem and is able to control performance (e.g., latency) more reliably.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for storing information associated with a communication application, the method comprising:

creating a plurality of indices for a plurality of users of the communication application, wherein each index of the plurality of indices is associated with at most one user of the plurality of users, wherein each of the plurality of indices is partitioned independently of the other indices, and wherein each of the plurality of indices maintains metadata to indicate how the index is partitioned;

receiving multiple messages associated with a first user of the plurality of users; and operating the computer system to:
store the multiple messages in a message table associated with the first user; and
index the multiple messages in an index of the plurality of indices, wherein the index is associated with the first user, wherein the index is divided into multiple divisions if a total number of messages stored in the message table exceeds a threshold value, wherein each division corresponds to messages received during a different time interval, wherein the index is time-partitioned based on an update rate to the index, and wherein hit counts for older divisions of the index other than a most recent division is cached for a query so that the older divisions need not to be opened next time the hit counts for the old divisions is required for a same query.

2. The method of claim 1, wherein the method further comprises accessing one or more of the index sub-divisions to obtain data in response to a query; and wherein the one or more of the index sub-divisions are accessed sequentially starting with a temporal subdivision associated with a most-recent time interval until a number-of-messages limit associated with the query is achieved.

3. The method of claim 2, wherein the number-of-messages limit is specified by the communication application.

4. The method of claim 3, wherein the number-of-messages limit specifies a number of query results presented in a document by the communication application.

5. The method of claim 1, wherein the storing of the information in the index involves opening the index;
wherein the multiple messages include concurrent messages that are aggregated in a group-commit queue at least while the index is being opened; and
wherein the storing of the multiple messages in the message table and the indexing of the multiple messages occurs as a batch operation.

6. The method of claim 5, wherein the method further comprises delaying the storing of the multiple messages in the message table and the indexing of the multiple messages for a time interval to allow the multiple concurrent messages to aggregate in the group-commit queue after the index is opened.

7. The method of claim 1, wherein the method further comprises conditionally updating a message summary table based on business logic when the multiple messages are stored in the message table.

8. The method of claim 1, wherein the first user has professional interconnections with other users of the communication application as specified by a social graph.

9. A computer-program product for use in conjunction with a computer system, the computer-program product comprising a non-transitory computer-readable storage medium and a computer-program mechanism embedded therein, to store information associated with a communication application, the computer-program mechanism including:
instruction for creating a plurality of indices for a plurality of users of the communication application, wherein each index of the plurality of indices is associated with at most one user of the plurality of users, wherein each of the plurality of indices is partitioned independently of the other indices, and wherein each of the plurality of indices maintains metadata to indicate how the index is partitioned;
instructions for receiving multiple messages associated with a first user of the plurality of users; and
instructions for operating the computer system to:
store the multiple messages in a message table associated with the first user; and
index the multiple messages in an index of the plurality of indices, wherein the index is associated with the first user, wherein the index is divided into multiple divisions if a total number of messages stored in the message table exceeds a threshold value, wherein each division corresponds to messages received during a different time interval, wherein the index is time-partitioned based on an update rate to the index, and wherein hit counts for older divisions of the index other than a most recent division is cached for a query so that the older divisions need not to be opened next time the hit counts for the old divisions is required for a same query.

10. The computer-program product of claim 9, wherein the computer-program mechanism further includes instructions for accessing one or more of the index sub-divisions to obtain data in response to a query; and
wherein the one or more of the index sub-divisions are accessed sequentially starting with a temporal subdivision associated with a most-recent time interval until a number-of-messages limit associated with the query is achieved.

11. The computer-program product of claim 10, wherein the number-of-messages limit is specified by the communication application.

12. The computer-program product of claim 9, wherein the storing of the information in the index involves opening the index;
wherein the multiple messages include concurrent messages that are aggregated in a group-commit queue at least while the index is being opened; and
wherein the storing of the multiple messages in the message table and the indexing of the multiple messages occurs as a batch operation.

13. The computer-program product of claim 12, wherein the computer-program mechanism further includes instructions for delaying the storing of the multiple messages in the message table and the indexing of the multiple messages for a time interval to allow the multiple concurrent messages to aggregate in the group-commit queue after the index is opened.

14. The computer-program product of claim 9, wherein the computer-program mechanism further includes instructions for conditionally updating a message summary table based on business logic when the multiple messages are stored in the message table.

15. The computer-program product of claim 9, wherein the first user has professional interconnections with other users of the communication application as specified by a social graph.

16. A computer system, comprising:
a processor;
memory; and
a program module, wherein the program module is stored in the memory and configurable to be executed by the processor to store information associated with a communication application, the program module including:
instructions for creating a plurality of indices for a plurality of users of the communication application, wherein each index of the plurality of indices is associated with at most one user of the plurality of users, wherein each of the plurality of indices is partitioned independently of the other indices, and wherein each of the plurality of indices maintains metadata to indicate how the index is partitioned;
instructions for receiving multiple messages associated with a first user of the plurality of users; and
instructions for operating the computer system to:
store the multiple messages in a message table associated with the first user; and
index the multiple messages in an index of the plurality of indices, wherein the index is associated with the first user, wherein the index is divided into multiple divisions if a total number of messages stored in the message table exceeds a threshold value, wherein each division corresponds to messages received during a different time interval, wherein the index is time-partitioned based on an update rate to the index, and wherein hit counts for older divisions of the index other than a most recent division is cached for a query so that the older divisions need not to be opened next time the hit counts for the old divisions is required for a same query.

17. The computer system of claim 16, wherein the program module further includes instructions for accessing one or more of the index sub-divisions to obtain data in response to a query; and
wherein the one or more of the index sub-divisions are accessed sequentially starting with a temporal subdivision associated with a most-recent time interval until a number-of-messages limit associated with the query is achieved.

18. The computer system of claim 17, wherein the number-of-messages limit is specified by the communication application.

19. The computer system of claim 16, wherein the storing of the information in the index involves opening the index;
wherein the multiple messages include concurrent messages that are aggregated in a group-commit queue at least while the index is being opened; and
wherein the storing of the multiple messages in the message table and the indexing of the multiple messages occurs as a batch operation.

20. The computer system of claim 16, wherein the program module further includes instructions for conditionally updating a message summary table based on business logic when the multiple messages are stored in the message table.

* * * * *

UNITED STATES PATENT AND TRADEMARK OFFICE
CERTIFICATE OF CORRECTION

PATENT NO.       : 9,514,217 B2
APPLICATION NO.  : 13/935088
DATED            : December 6, 2016
INVENTOR(S)      : Swaroop Jagadish et al.

It is certified that error appears in the above-identified patent and that said Letters Patent is hereby corrected as shown below:

On the Title Page

Item (73) (Assignee), please delete the word "LinkIn" and replace it with the word -- LinkedIn --

Signed and Sealed this
Twenty-fifth Day of April, 2017

Michelle K. Lee
*Director of the United States Patent and Trademark Office*